3,389,104
COATING COMPOSITIONS AND METHODS OF
PRODUCING THE SAME
Richmond O. Austin and Dan C. Schmidt, Hattiesburg, Miss., assignors to Pan American Tung Research and Development League, Hattiesburg, Miss., a corporation of Louisiana
No Drawing. Filed May 7, 1964, Ser. No. 365,806
20 Claims. (Cl. 260—22)

This invention relates to coating compositions containing oil modified alkyd resins and particularly to such compositions utilizing tung oil and methods for their preparation.

Oil modified alkyd resins have found wide-spread use in many types of coating compositions. The drying speed of a coating composition is one of the major factors in its commercial value. It is standard practice, in order to accelerate the drying of such compositions, to add driers. The driers are usually heavy metal compounds which add to the cost of the product. Many of the widely used driers are detrimental to the physical properties of the coating compositions. As an illustration, some driers tend to deteriorate causing the coating film to yellow and, in some cases, embrittle.

It has been suggested to prepare coating compositions containing methacrylate polymers in combination with various alkyd resins. Typical of these compositions is that shown in U.S. Patent 2,708,188, issued May 10, 1955, to Goldstein, which discloses a printing ink composition containing a methyl methacrylate, an oil modified alkyd resin and a vinyl chloride-vinyl acetate copolymer. The composition is prepared, in one modification, by reacting methyl methacrylate with an oil modified alkyd resin formed by combining a polyhydric alcohol and polybasic acid in which some of the polybasic acid is substituted by acids of the drying type. The suggested oils are dehydrated castor, soya and linseed. The ink composition in very thin films, such as 0.0002 inch, is cured in five to ten minutes by heating at 120° to 140° F. or at 250° to 300° F. for about twenty seconds. Thicker films of the composition, however, require substantially longer drying periods.

The primary object of this invention is to provide a coating composition which dries rapidly in both air and at a low baking temperature without the need of conventional driers. Another object of the invention is to provide such a composition which yields a flexible coating film which is both durable and non-yellowing. Another object is to produce a novel copolymer resin for use as a binder in coating compositions. A further object is to provide processes for producing such compositions. Other objects and the advantages of the invention will appear from the following detailed description.

In accordance with the invention, it has been discovered that an excellent coating composition binder can be prepared by forming a copolymer of a tung oil modified alkyd resin and an acrylic ester by heating the components in the presence of a polymerization catalyst. The resulting binder can be admixed with solvents, pigments, fillers and other conventional additives and applied as a coating. The coating dries rapidly in air and also at low baking temperture without the addition of conventional driers. The resulting film is tough and flexible and is substantially non-yellowing over extended periods of time. Clear coatings formed with this novel binder will air-dry to a nontacky film in less than twenty minutes and when pigments are added, the drying time is less than ten minutes.

The oil modified alkyd resin utilized in this invention is formed by combining tung oil with a polybasic acid, a polyhydric alcohol and a second vegetable oil having drying properties. In this specification and claims, the term "vegetable oil having drying properties" includes vegetable oils and fatty acid derivatives thereof of the semi-drying and drying type. The ratio of tung oil to the second vegetable oil is critical to the invention in order to obtain the desired rapid drying qualities.

The term "polyhydric alcohol" as used herein includes any alcohol containing at least three hydroxyl groups in the molecule. As a general rule, best results are obtained when the number of hydroxyl groups does not exceed six. Typical examples of suitable alcohols are glycerol, pentaerythritol, polyallyl alcohol, mannitol, sorbitol, erythritol and trimethylol propane. The amount of alcohol employed is usually between about 3 to about 20% based on the total weight of the reactants used to form the alkyd resin. Particularly good alkyd resins have been obtained with about 8 to about 16% alcohol. The alcohol is always utilized in excess of the amount theoretically required to neutralize all the carboxyl groups in the starting reactants.

The term "polybasic acid" as used herein includes the acids as well as their anhydrides. The most commonly utilized acids are those containing two or three carboxyl groups. Typical examples of such acids are malonic, succinic, glutaric, adipic, sebacic, maleic, itaconic, methylmalonic, perfluoroglutaric, perfluoroadipic phthalic and 1,2,4-butane-tricarboxylic acid. Phthalic anhydride is preferred both for the desirable properties it gives the alkyd and its relative cost. The amount of polybasic acid employed is usually between about 5 to about 35% based on the total weight of the alkyd resin with a range of about 15 to about 26% being preferred.

Typical examples of the secondary vegetable oils which can be utilized in accordance with the invention are tall oil, tall oil fatty acid containing less than 26% rosin by weight, linseed oil, soybean oil and safflower oil. The total oil utilized in forming the alkyd resin is from about 45 to about 92%, based on the total weight of the alkyd resin, and preferably about 58 to about 77%. As indicated, the amount of tung oil utilized is critical to the invention. Additionally, the tung oil must contain at least 35% eleostearic acid. Of this total oil, at least 18% has to be tung oil with a maximum of 60%. The preferred range is 20 to 30% of the total oil. The secondary oil should make up at least 40% of the total oil.

The long-oil modified alkyd resin is prepared by any of the conventional methods, such as by heating in an aromatic organic solvent under reflux at atmospheric pressure. The reaction is usually carried out at a temperature of about 100° to 300° C. and is complete in from about 1 to about 3 hours. The order of addition of the reactants is not critical.

The tung oil alkyd resin is then reacted with an acrylic ester in the presence of a polymerization catalyst to form a copolymer. The acrylic ester is a lower alkyl acrylate, preferably containing 4 to 10 carbon atoms, such as methyl methacrylate, ethyl methacrylate, propyl methacrylate, butyl methacrylate, methyl acrylate, ethyl acrylate and butyl acrylate. The polymerization catalyst is preferably of the peroxide type. Typical examples of suitable catalysts are acetyl peroxide, lauroyl peroxide, succinyl peroxide, tert.-butyl hydroperoxide, di-tert.-butyl peroxide, cumene, hydroperoxide, caprylyl peroxide, azoisobutylronitrile and methyl azoisobutyrate. The amount of catalyst utilized is usually about 0.1 to 2.5%, based on the weight of the acrylate, with the range of 0.2 to 1.0% being preferred. The amount of the acrylic ester used to form the copolymer is preferably about 25 to about 75%, based on the total weight of the copolymer, with about 40 to about 60% being preferred. The amount of oil modified alkyd resin utilized is, therefore, about 25 to about 75% with about 40 to about 60% being preferred.

The reaction of the oil modified alkyd with the acrylic ester is preferably carried out in an organic solvent. Xylene is the preferred solvent, but any of the aromatic solvents can be utilized, such as toluene, aromatic petroleum solvents with a flash point of about 105 to 120° C., and polar solvents such as butyl acetate. The reaction temperature can be varied, but is preferably above 100° C. with the range of 100° C. to 140° C. being particularly effective. A most convenient way to carry out the reaction is at the reflux temperature of the mixture at atmospheric pressure. The reaction is continued until a suitable viscosity is obtained. It has been found that products having a viscosity of 1.25 to about 18 poises when measured at 25° C. at 50% non-volatile in xylene are particularly satisfactory. The resulting copolymer resin can be diluted to the desired coating concentration and mixed with the usual pigments, fillers, and the like desired for the particular use.

Experimental evidence indicates that the triple conjugated structure of the eleostearic acid part of the tung oil in the alkyd resin, with the aid of the peroxide catalyst, forms a six-membered cyclic structure during hydrolysis with the polyhydric alcohol and esterification with phthalic anhydride. The acrylic ester then reacts at the double bond sites in the oleic and linoleic acid part of the molecule. The secondary drying oil is added to the alkyd resin to serve as acceptors for the acrylic ester and to give better control of the reaction. The resulting copolymer resin produces high speed drying films which do not require oxidation catalyst or high baking temperature to produce a hard, tough film.

The following examples are given for purposes of illustration:

EXAMPLE 1

A mixture of 152.0 grams of tung oil and 152.0 grams of tall oil fatty acid was heated at atmospheric pressure in a one liter-three neck flask provided with stirrer, thermometer, and an inlet for $CO_2$ to provide an inert atmosphere.

At 245–255° C., one-half (40.0 grams) of the pentaerythritol was added. The batch was held at 245–255° C. for ten minutes, 0.02 gram of calcium hydroxide catalyst was added, the above temperature held for an additional 10–15 minutes. The remaining 40.0 grams of pentaerythritol was then added and alcoholysis continued until complete. At this point, the temperature was lowered to 195–205° C. and 115.0 grams of phthalic anhydride was added. The temperature of 200° C. was held until the acid value dropped to 23.0 (total reaction time—3½ hours).

EXAMPLE 2

The following were charged to a three-neck flask:

| | Grams |
|---|---|
| Alkyd of Example 1 | 200 |
| Methyl methacrylate | 200 |
| Xylene | 200 |
| Di-tertiary-butyl peroxide | 10 |

The mixture was heated at reflux temperature, 120 to 130° C., for five hours to give a viscosity of fifteen poises. The product was then thinned to 50% non-volatile with xylene and formulated into pigmented coatings.

Table I shows the various components of the alkyd resins produced. The components of each composition were combined and reacted at 200–240° C. until an acid value of 20 to 25 was obtained. The reaction product was immediately cooled.

TABLE I

| Examples | 3 | 4 | 5 | 6 | 7 | 8 | 9 | 10 |
|---|---|---|---|---|---|---|---|---|
| Composition (Parts by Weight): | | | | | | | | |
| Tall oil fatty acid | 152.0 | 152.0 | | | | | | |
| Tung oil | 152.0 | 152.0 | 152.0 | 152.0 | 152.0 | 152.0 | 152.0 | 152.0 |
| Linseed oil | | | 152.0 | 152.0 | | | | |
| Soybean | | | | | 152.0 | 152.0 | | |
| Pentaerythritol | 80 | | 80 | | 80 | | 80 | |
| Glycerol | | 75 | | 75 | | 75 | | 75 |
| Phthalic anhydride | 118.4 | 118.4 | 118.4 | 118.4 | 118.4 | 118.4 | 118.4 | 118.4 |
| Litharge | .02 | .02 | .02 | .02 | .02 | .02 | .02 | .02 |

About 33⅓ parts of methyl methacrylate, about 33⅓ parts of xylene and 2.0% by weight, based on the weight of the acrylate, of di-tertiary-butyl peroxide were added to the reaction vessel following the preparation of each long-oil alkyd of Examples 3 to 10 and the mixture heated at reflux temperature (120–130° C.) until the viscosity indicated in Table II was reached. This viscosity is in poises at 50% non-volatile in xylene.

TABLE II

| Example | Alkyd Resin | Viscosity (Poises) | Color (Gardner) | Acid Value |
|---|---|---|---|---|
| 11 | Example 3 | 2.50 | 10 | 8.8 |
| 12 | Example 4 | 2.75 | 9 | 10.1 |
| 13 | Example 5 | 3.00 | 9 | 9.2 |
| 14 | Example 6 | 2.50 | 11 | 11.9 |
| 15 | Example 7 | 2.00 | 6 | 11.6 |
| 16 | Example 8 | 2.75 | 10 | 10.9 |
| 17 | Example 9 | 1.25 | 9 | 11.5 |
| 18 | Example 10 | 1.25–1.40 | 6 | 13.3 |

The long-oil alkyd-acrylate copolymer prepared in Examples 11 to 18 were compounded into pigmented coatings of 50% solids in xylene using the following general formula:

| Ingredient: | Pounds |
|---|---|
| Basic carbonate white lead | 330.0 |
| Titanium dioxide | 182.6 |
| Aluminum silicate | 182.6 |
| P.E. Ester Gum [1] (50% by weight in xylene) | 128.0 |
| Alkyd-acrylate copolymer | 487.2 |
| Anti-skinning agent | 1.6 |

[1] Pentaerythritol ester of gum, wood or tall oil rosin.

Pigmented paint compositions and identical clear alkyd-acrylate copolymer compositions of Examples 11 to 18 were drawn down on glass to a wet film thickness of three mils. The time required for the film to dry to a non-tacky, hard film are shown in Table III.

TABLE III

| Example | Paint Composition | Drying Time (minutes) |
|---|---|---|
| 19 | Example 11 | 12 |
| 20 | Example 11 pigmented | 3 |
| 21 | Example 12 | 4 |
| 22 | Example 12 pigmented | 3 |
| 23 | Example 13 | 7 |
| 24 | Example 13 pigmented | 3 |
| 25 | Example 14 | 8 |
| 26 | Example 14 pigmented | 4 |
| 27 | Example 15 | 16 |
| 28 | Example 15 pigmented | 9 |
| 29 | Example 16 | 9 |
| 30 | Example 16 pigmented | 4 |
| 31 | Example 17 | 8 |
| 32 | Example 17 pigmented | 4 |
| 33 | Example 18 | 6 |
| 34 | Example 18 pigmented | 6 |

In order to demonstrate the superior color obtained with coating films produced in accordance with this invention, the composition of Example 20, using the amounts of methyl methacrylate indicated, was drawn on a glass plate to a wet thickness of 0.003 inch. One film was dried at room temperature and the other film was baked in an oven for thirty minutes at 163° C. to accelerate yellowing and then cooled. The two films were then compared with a Gardner Automatic Color Difference Meter and the color differences between the two films tabulated in Table IV. The higher the number listed under "Yellowing Difference," the more yellow the film.

TABLE IV

| Example No. | Methyl Methacrylate [1] | Yellowing Difference [2] |
|---|---|---|
| 35 | 0 | 17.0 |
| 36 | 10 | 10.0 |
| 37 | 30 | 6.0 |
| 38 | 50 | 2.0 |
| 39 | 70 | 1.1 |
| 40 | 90 | 0.3 |
| 41 | 110 | 0.1 |

[1] Parts per 100 parts of Alkyd Resin Solids.
[2] A difference of 2 or less is essentially zero being within the experimental error of the machine.

Table IV indicates that the composition of the invention progressively resists yellowing as the amount of acrylic ester is increased.

In order to demonstrate the superiority of the composition of the invention in drying time over similar compositions without the tung oil, compositions were prepared following the procedure used in Examples 11 to 18 with various oils. The properties of these compositions are shown in Table V utilizing xylene as the solvent.

TABLE V

| Properties | Oiticica Oil | Safflower Oil | Dehydrated Castor Oil | Soybean Oil | Linseed Oil |
|---|---|---|---|---|---|
| Viscosity (poises) | 1.40 | 0.50 | 2.50 | 1.40 | 0.85 |
| Color | 7 | 4 | 2 | 4 | 7 |
| Acid Value (100%) | 16.7 | 11.3 | 8.8 | 5.4 | 8.4 |
| Non-volatile Comp. (percent) | 50 | 50 | 50 | 50 | 50 |
| Drying Time (Tack-free) | [1] 47 | [1] 34 | [2] 36 | [2] 8 | 8 |

[1] Minutes. [2] Hours.

Any departure from the foregoing description which conforms to the invention is intended to be included within the scope of the claims.

What is claimed is:

1. A rapid air drying coating composition which comprises a volatile solvent and a copolymer comprising the product obtained by mixing together a solution of a polymerization catalyst, a lower alkyl acrylate and a tung oil modified alkyd resin and thereafter heating the solution at a temperature above 100° C. to polymerize the acrylate and alkyd resin, said alkyd resin comprising about 45 to about 92% oil, about 18% to about 60% of said oil being tung oil and at least 40% of the total oil being a secondary vegetable oil having drying properties, at least 3% of a polyhydric alcohol and at least 5% of a polybasic organic acid, said copolymer containing at least 25% of said lower alkyl acrylate and at least 25% of said tung oil modified alkyd resin.

2. A rapid air drying and low temperature heat hardenable coating composition which comprises a volatile organic solvent and a copolymer comprising the product obtained by mixing together a solution of a polymerization catalyst, about 25 to about 75% of a lower alkyl acrylate and about 25 to about 75% of a tung oil modified alkyd resin and thereafter heating the solution at a temperature above 100° C. to polymerize the acrylate and alkyd resin, said alkyd resin consisting essentially of about 5 to about 35% of phthalic anhydride, about 3 to about 20% of a polyhydric alcohol and about 45 to about 92% oil, about 18 to about 60% of said oil being tung oil and the remaining part of said oil being a secondary vegetable oil having drying properties.

3. A rapid air-drying and low temperature heat hardenable coating composition which comprises a volatile organic solvent and a copolymer comprising the product obtained by mixing together a solution of about 40 to 60% of a lower alkyl acrylate, about 40 to about 60% of a tung oil modified alkyd resin and about 0.1 to about 2.5%, based on the weight of the lower alkyl acrylate, of a peroxide polymerization catalyst and thereafter heating the solution at a temperature above 100° C. to polymerize the acrylate and alkyd resin, said alkyd resin consisting essentially of about 15 to about 26% of phthalic anhydride, about 8 to about 16% of a polyhydric alcohol, about 45 to about 92% oil, about 18 to about 60% of said oil being tung oil and the remaining part of said oil being a secondary vegetable oil having drying properties.

4. The composition of claim 3 wherein said lower alkyl acrylate is methyl methacrylate.

5. The composition of claim 3 wherein said polyhydric alcohol is pentaerythritol.

6. The composition of claim 3 wherein said polyhydric alcohol is glycerine.

7. The composition of claim 3 wherein the viscosity of said copolymer is about 1.25 to about 18 poises at 50% non-volatile in xylene.

8. A rapid air-drying and low temperature heat hardenable coating composition which comprises a volatile organic solvent and a copolymer comprising the product obtained by mixing together a solution of about 40 to 60% of a lower alkyl acrylate, about 40 to about 60% of a tung oil modified alkyd resin and about 0.1 to about 2.5%, based on the weight of the lower alkyl acrylate, of a peroxide polymerization catalyst and thereafter heating the solution at a temperature above 100° C. to polymerize the acrylate and alkyd resin, said alkyd resin consisting essentially of about 15 to about 26% of phthalic anhydride, about 8 to about 16% of a polyhydric alcohol, about 45 to about 92% oil, about 18 to about 60% of said oil being tung oil and the remaining part of said oil being a secondary oil having drying properties selected from the group consisting of safflower oil, linseed oil, soybean oil, tall oil and tall oil fatty acid containing less than about 26% rosin by weight.

9. A rapid air-drying and low temperature heat hardenable coating composition which comprises a volatile organic solvent and a copolymer comprising the product obtained by mixing together a solution of a polymerization catalyst, about 25 to about 75% of a lower alkyl methacrylate and about 25 to about 75% of a tung oil modified alkyd resin and thereafter heating the solution at a temperature above 100° C. to polymerize the acrylate and alkyd resin, said alkyd resin consisting essentially of about 5 to about 35% phthalic anhydride, about 3 to about 20% of pentaerythritol and about 45 to about 92% of an oil, said oil comprising 18 to 60% of tung oil and about 40 to about 82% of a secondary oil having drying properties selected from the group consisting of safflower oil, linseed oil, soybean oil, tall oil and tall oil fatty acid containing less than about 26% rosin by weight.

10. The composition of claim 9 wherein the viscosity of said polymer is about 1.25 to about 18 poises at 50% non-volatile in xylene.

11. A rapid air-drying and low temperature heat hardenable coating composition which comprises a volatile organic solvent and a copolymer comprising the product obtained by mixing together a solution of a polymerization catalyst, about 25 to about 75% of a lower alkyl methacrylate and about 25 to about 75% of a tung oil modified alkyd resin and thereafter heating the solution at a tempearture above 100° C. to polymerize the acrylate and alkyd resin, said alkyd resin consisting essentially of about 5 to about 35% phthalic anhydride, about 3 to about 20% of glycerine and about 45 to about 92% oil, 18 to 60% of the oil being tung oil and the remaining portion a second oil having drying properties selected from the group consisting of safflower oil, linseed oil, soybean oil, tall oil and tall oil fatty acid containing less than about 26% rosin by weight.

12. The composition of claim 11 wherein the viscosity of said polymer in 50% xylene is about 1.25 to about 18.

13. A rapid air-drying and low temperature heat hardenable coating composition which comprises a volatile organic solvent and a copolymer comprising the product obtained by mixing together a solution of a polymerization catalyst, about 40 to about 60% of a lower alkyl methacrylate and about 40 to about 60% of a tung oil modified alkyd resin and thereafter heating the solution at a temperature above 100° C. to polymerize the acrylate and alkyd resin, said alkyd resin consisting essentially of about 15 to about 26% phthalic anhydride, about 8 to about 16% of pentaerythritol and about 58 to about 77% of an oil, about 20 to about 30% of said oil being tung oil and about 70 to about 80% of the oil being a secondary oil having drying properties selected from the group consisting of safflower oil, linseed oil, soybean oil, tall oil and tall oil fatty acid containing less than about 26% rosin by weight.

14. The composition of claim 13 wherein the viscosity of said copolymer is about 1.25 to about 18 at 50% non-volatile in xylene.

15. A resinous material which is particularly adapted as a binder for rapid air-drying coating composition comprising the product obtained by mixing together a solution of polymerization catalyst, at least 25% of a lower alkyl acrylate and at least 25% of a preformed oil modified alkyd resin and thereafter heating the solution at a temperature above 100° C. to polymerize the acrylate and alkyd resin, said alkyd resin being the product of reacting 5 to about 35% of phthalic anhydride, 3 to 20% of a polyhydric alcohol containing 3 to 6 hydroxy groups and about 45 to 92% of an oil, 18 to 60% of the oil being tung oil and 40 to 82% being a vegetable oil having drying properties.

16. A process for preparing a modified alkyd resin which comprises mixing together a solution of a polymerization catalyst, about 25 to about 75% of a lower alkyl acrylate and about 25 to about 75% of a preformed oil modified alkyd resin and thereafter heating the solution at a temperature above 100° C. to polymerize the acrylate and alkyd resin, said alkyd resin being the product of reacting about 5 to about 35% of a dibasic organic acid, about 3 to about 20% of a polyhydric alcohol and about 45 to about 92% of an oil, 18 to 40% of said oil being tung oil and about 60 to about 82% a secondary vegetable oil having drying properties.

17. A process for preparing a modified alkyd resin which comprises mixing together a solution of a polymerization catalyst, about 25 to about 75% of a lower alkyl acrylate and about 25 to about 75% of a preformed oil modified alkyd resin and thereafter heating the solution at a temperature above 100° C. to polymerize the acrylate and alkyd resin, said alkyd resin being the product of reacting about 5 to about 35% of a phthalic anhydride, about 3 to about 20% of a polyhydric alcohol containing 3 to 6 hydroxy groups, and about 45 to about 92% of an oil, said oil comprising about 18 to 40% tung oil and 60 to 82% of a secondary vegetable oil having drying properties.

18. A process for preparing a modified alkyd resin which comprises mixing together a solution of a polymerization catalyst, about 40 to about 60% of a lower alkyl acrylate and about 40 to about 60% of a preformed oil modified alkyd resin and thereafter heating the solution at a temperature above 100° C. to polymerize the acrylate and alkyd resin, said alkyd resin being the product of reacting about 15 to about 26% of a phthalic anhydride, about 8 to about 16% of a polyhydric alcohol containing 3 to 6 hydroxy groups, and about 58 to about 77% of an oil, said oil comprising about 20 to about 30% tung oil and 70 to 80% of a secondary vegetable oil having drying properties.

19. The process of claim 18 wherein said polyhydric alcohol is pentaerythritol.

20. The process of claim 18 wherein said polyhydric alcohol is glycerine.

References Cited

UNITED STATES PATENTS

| | | | |
|---|---|---|---|
| 3,198,759 | 8/1965 | Schmidle | 260—22 |
| 3,228,900 | 1/1966 | Spellberg et al. | 260—22 |

FOREIGN PATENTS

| | | |
|---|---|---|
| 866,598 | 4/1961 | Great Britain. |

DONALD E. CZAJA, *Primary Examiner.*

L. J. BERCOVITZ, *Examiner.*

R. W. GRIFFIN, *Assistant Examiner.*